July 27, 1943.  B. G. CARLSON  2,325,108
AIRCRAFT CONTROL DEVICE
Filed April 16, 1942   3 Sheets-Sheet 2

Fig. 2.

INVENTOR.
BERT G. CARLSON.
BY
*Frank H. Harmon*
ATTORNEY.

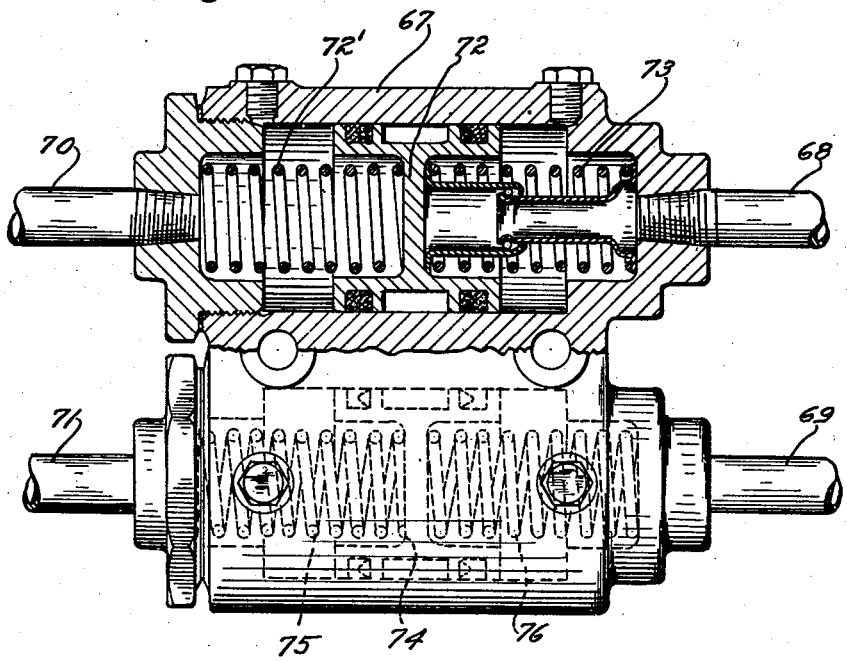

Patented July 27, 1943

2,325,108

UNITED STATES PATENT OFFICE 2,325,108

AIRCRAFT CONTROL DEVICE

Bert G. Carlson, Erieside, Ohio, assignor to Jack & Heintz, Inc., Bedford, Ohio, a corporation of Ohio Application April 16, 1942, Serial No. 439,213

8 Claims. (Cl. 244—78)

This invention relates in general to automatic pilots for aircraft and more particularly to an automatic control for the amount and rate of rudder and aileron operation.

In the conventional hydraulic automatic pilot the gyro is air spun and its precession movements are transmitted through an air operated relay to the hydraulic system and to the aircraft control surfaces. One of the disadvantages of the conventional system, with respect more particularly to rudder and aileron control, is the tendency of the automatic pilot toward over control as the aircraft skids, rolls or yaws off course in normal straightaway flight. Another disadvantage is the difficulty encountered in controlling the desired amount and rate of turn and providing the proper amount of aileron control and bank for the turn.

An object of this invention is to provide a means whereby the amount of rudder applied will vary directly with the rate at which the aircraft yaws off course and to provide a combined amount and rate follow-up system that will minimize or eliminate over controlling of the rudder and to provide the proper coordination of rudder and aileron in violent air conditions so as to reduce the cable loads as well as amount of roll and yaw.

Another object is to provide a simple control system whereby the desired new compass course, or amount of turn, as well as the rate of turn may be manually set and then the actual turn set and initiated and continued at the predetermined rate until completed and to simultaneously apply aileron control in amounts that vary with the rudder load and the correct angle of bank, all without overcontrol of the rudder or aileron due to sudden tendencies toward rolling, skidding or yawing.

According to the present invention there are provided the conventional air spun directional and horizon gyros and air relays to take charge of the rudder and aileron hydraulic servos for normal straightaway flight. Interjected into the hydraulic system is an oil spun gyro with its own balanced oil valve. The oil spun gyro is sufficiently spring loaded so for normal straightaway flight it does not precess or interfere with the conventional ones operated by the air relay diaphragms. However, for purposes of controlling the amount and rate of a turn, when the oil is shut off from the air relay operated balanced oil valves, the balanced oil valve of the oil spun gyro regulates flow of oil to the servo motors and consequently takes charge of the operation of the rudder and aileron to the exclusion of the balanced oil valves that are operated by the air relays.

For the operation of the ailerons an air spun horizon gyro is used to operate an air relay, which in turn operates a balanced oil valve regulating the flow of pressure oil to the aileron servo cylinder. Interposed between this oil valve and the aileron servo is a spring balanced piston in each of the two oil pipe lines which are in circuit with the hydraulic system as a whole.

In straightaway flight the damped pendulum of the horizon gyro compensates for any gyro precession caused by acceleration which would apply aileron and put a wing down. In turns this pendulum applies aileron to maintain the correct amount of bank. The spring balanced pistons in the aileron servo hydraulic circuit acts as a rudder assistor in that it applies aileron to speed the recovery from violent yaws. In automatic turns it applies aileron simultaneously with or slightly in advance of, rudder application and the amount of aileron applied varies with the rudder load and the correct angle of bank.

The manual control system for the automatic pilot comprises four control knobs, one of which centralizes the gyro indicators before engaging the automatic pilot, one of which controls the operation of the conventional part of the automatic pilot for the rudder and aileron directional and horizon gyros, one of which shuts off and on the flow of oil supply to the main balanced oil valve in the hydraulic circuit and one which regulates the rate of turn through the oil spun gyro and its associated balanced oil valve to the rudder and aileron servo motors.

With the foregoing and other objects in view, the invention consists in the combination of parts and in the details of construction hereinafter set forth in the following specification and appended claims, certain embodiments thereof being illustrated in the accompanying drawings, in which:

Figure 2 is a schematic view of the control system showing certain parts in transverse section.

Figure 3 is a view in longitudinal section taken through one rudder assistor cylinder and spring balanced piston, the other cylinder being shown in side elevation with the inner parts in dotted lines.

Figure 1:
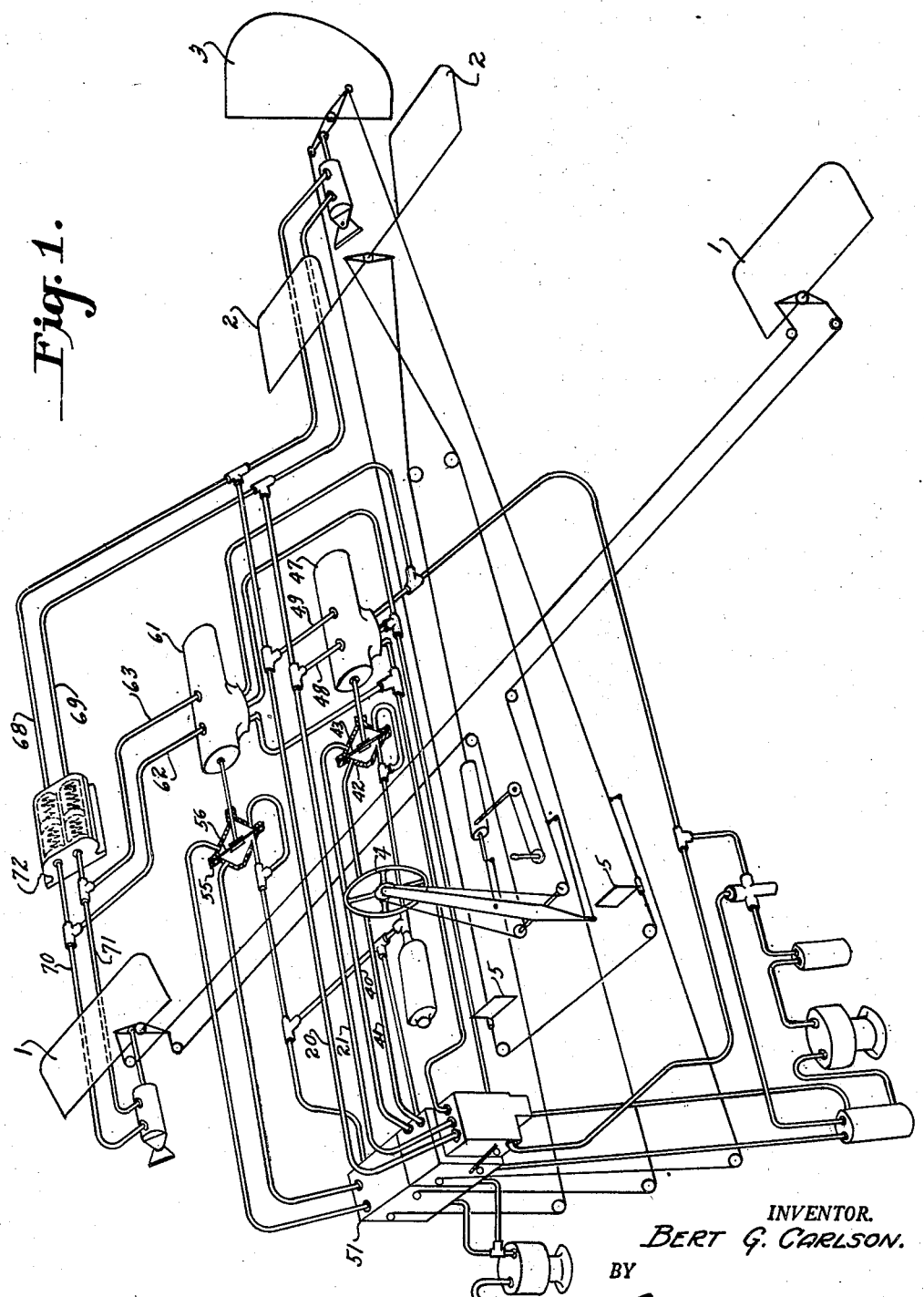
Figure 1 is a schematic view of the control system as applied to the aircraft control surfaces.

Referring more particularly to the drawings, Figure 1 shows the conventional arrangement of aircraft ailerons 1, elevators 2 and rudder 3 as well as the manual wheel control 4 and associated cables for operating the ailerons and elevators and the conventional rudder pedals 5 and associated cables for operating the rudder.

As stated before, the present invention is more particularly directed to improvements in amount and rate of rudder control and corresponding aileron control for stability and automatic turns and, as far as structure is concerned, it mainly comprises the addition into an air relay controlled hydraulic system for rudder and aileron control of an oil spun gyro for controlling a balanced oil valve regulating flow of pressure oil to the rudder servo cylinder and a rudder assistor, or oil pressure member, for regulating operation of the aileron servo in accordance with rudder operation in addition to the conventional air relay controlled balanced oil valves regulating flow of oil to the rudder and aileron servo cylinder.

As shown in Figure 2, the oil spun gyro assembly includes a casing 6 and a directional type of gyro rotor 7 mounted on horizontal pivots 8 in a gimbal 9 to form a spinning axis corresponding normally to the longitudinal axis of the aircraft. The gimbal 9 is provided with trunnions 10 and 11 for rotation in suitable bearings in the casing. An oil jet 12 discharges oil under pressure to gyro wheel buckets 13 to spin the wheel. An oil supply pipe 14 leads into the casing and through the passageway 15 to the oil jet 12 and through passageway 16 to cylinder 17. The passageways 18 and 19 leading to pipes 20 and 21 are opened and closed by pistons 22 and 23. The furnishing of oil under pressure through pipe 20 or 21 into a hydraulic servo cylinder 24 on either side of the piston 25 causes oil to be forced out of the cylinder on the other side of the piston and out through the corresponding other pipe and causes a movement of the rudder 3 in the corresponding direction. In the position shown in Figure 2 both passages 18 and 19 are closed by pistons 22 and 23.

Operation of the "rate" knob 26, through appropriate shafting represented in dot and dash line 27 effects a rotation of shaft 28 and its worm 29 engaging a worm wheel 30 carried by a shaft 36 mounted in suitable bearings in casing 6. Shaft 36 carries a segmental plate 32 fixed thereto which is provided with appropriate recesses to be engaged by a fixed spring detent 33 so as to resiliently maintain the plate in various adjusted positions. The plate 32 has fixed thereto an arm 34 to receive one end of a tension coil spring 35 whose other end is secured to a pin of a crank 37 keyed to the gimbal trunnion 11. Thus an adjustment of control knob 26 effects a spring loaded biasing of the gimbal and its rotor, which in this case is only mounted for two degrees of freedom, either to the left or right and to a predetermined degree as indicated by the control knob dial 38.

For normal straightaway flight the conventional air spun gyro and air relay controlled balanced oil valve is used for operating the rudder servo. The air spun gyro assembly in the casing 39 includes any suitable air spun gyro of the directional type and any suitable air pick off for leading air under pressure through tube 40 or 41 to the air relay 42 on either side of the diaphragm 43 for the actuation of the balanced oil valve 44, 45, 46 in casing 47 for regulating flow of pressure oil through pipe 48 or 49 to the hydraulic servo cylinder 24 to either side of the piston 25 for operating the rudder 3 through the piston rod 50 in either direction.

The air spun horizon gyro assembly in casing 51 includes a damped pendulum for compensating for precession of the gyro by reason of acceleration. As is conventional, the air tubes 53 and 54 lead to an air relay 55 to either side of a diaphragm 56 connected to a piston rod 59 for operating pistons 58, 59 and 60 of the balanced oil valve in casing 61. Also the pistons in this balanced oil valve regulate the flow of pressure oil through pipes 62 and 63 to the aileron servo cylinder 64 to operate the aileron 1 in either direction through piston rod 66.

Arranged between pipes 20 and 21 and pipes 62 and 63 is a rudder assistor in a casing 67 with pipes 68 and 69 leading to pipes 20 and 21 and with pipes 70 and 71 leading to pipes 62 and 63.

The rudder assistor is actually for operating the ailerons and comprises a cylinder to receive a piston 71 spring pressed to the right by a compression coil spring 72' and to the left by a compression coil spring 73 so as to be balanced. As shown the cylinder in which a corresponding piston 74 is located and balanced by springs 75 and 76, is in communication with pipes 69 and 71.

When it is desired to make an ordinary turn with the conventional part of the automatic pilot, without using the oil spun gyro assembly and without regard to predetermining the rate of turn, the knob 77 is left in the "off" position leaving the oil stop valve 78 open for distribution of pressure oil to the balanced oil valve in casing 54. Turning of knob 79 through conventional gearing as shown in Figure 2, biases the air spun directional gyro assembly in casing 39 and the horizon gyro assembly for operation of the rudder and ailerons.

It will be seen, that despite the previously described spring loading of the oil spun gyro in the casing 6, if an abnormal yaw occurs and if there is any tendency toward overcontrol by the rudder, the oil spun gyro assembly will temporarily overcome its spring loading and take charge to eliminate such over control. In this manner the amount of rudder applied varies directly with the rate at which the aircraft yaws off course and the combined amount and rate follow-up eliminates over control. The damped pendulum 52 compensates for any precession of the horizon gyro 80 caused by acceleration which would apply aileron and put a wing down. In turns this pendulum applies ailerons to maintain the correct amount of bank.

In operation for automatic turns the control knob 83 is turned to centralize the gyro indicators before engaging the automatic pilot. The control knob 77 is then turned to "on" position which through the oil stop valve 78 shuts off the supply of oil to the main balanced oil valves in casings 47 and 61. The control knob 79 is then rotated until the top compass card 81 indicates in calibrated degrees the heading of the new course to be flown. The control knob 26 is then turned, to the left or right as required, to index 38 denoting the rate of turn desired. As previously explained the turning of knob 26, through shafting 27, 28 puts the oil spun gyro 7 under flexible bias through spring 35 and consequently the balanced oil valve 22, 23 regulates the flow of oil pressure oil to either side of the piston 25 in the rudder servo cylinder 24. The turn thus initiated will continue until the "off-on" control knob 77 is turned to "off" position and the "rate" control knob 26 is turned to zero position. In other words, the fixed rate of turn will continue as long as called for. Knob 77 should be turned to "off" position and knob 26 should be returned to zero position within 30 degrees, plus or minus spread of the two compass cards 81 and 82 in order to straighten out on the compass heading set for 10 to 15 degrees in advance on approaching a course originally set to avoid over run. If this spread has been exceeded the control knob 26 should be turned hard over, in the corresponding direction, and returned to zero position when the compass cards 81 and 82 approach alignment within the 60 degree spread.

As the pressure oil from pipes 20 and 21 deliver oil under greater pressure either to the left or right of piston 25 in the rudder servo cylinder 24 to apply left or right rudder a corresponding greater oil pressure is applied through pipe 69 or 68 to piston 74 or 71 in the rudder assistor. Should the oil pressure in pipe 68 be greater than that in pipe 69, the pressure of the column of oil on valve 72 plus the expansive force of spring 73 overcomes the balancing action of compression spring 72 and thus valve 72' is forced from right to left. This creates an added pressure on the column of oil in pipe 70 and to the left side of piston 65 in the aileron servo cylinder 64 and through piston rod 66 the ailerons 1 are moved in the corresponding direction as the rudder in order to assist the rudder in the automatic turn by properly banking the aircraft. As a matter of fact the action of the rudder assistor in effecting aileron control slightly precedes the initiation and completion of the rudder control for such automatic turns so as to insure proper bank and turn and eliminate any tendency for the aircraft to skid. It, of course, follows that control of the rudder in the opposite direction brings piston 74 of the rudder assistor into action to correspondingly effect an appropriate aileron control.

From the foregoing, it will be seen that there has been provided an automatic pilot system wherein the amount of rudder applied will vary directly with the rate at which the aircraft yaws off course and wherein the combined amount and rate follow-up will eliminate over control.

It will also be seen that there has been provided an aileron control, in the form of a rudder assistor, in which a damped pendulum for the horizon gyro compensates for any gyro precession caused by acceleration which would apply aileron. In turns this pendulum applies aileron to maintain the correct amount of bank. The rudder assistor applies aileron to speed recovery from violent yaws and in automatic turns it applies aileron simultaneously with, or slightly prior to, rudder application and the amount of aileron applied varies with the rudder load and the correct angle of bank.

The oil spun gyro assembly and balanced oil valve and rudder assistor, or aileron control, controlled thereby under control of the "rate" knob effectively brings about a controlled operation of rudder and ailerons together and a consequent controlled rate of turn and may be readily installed as a unit in the hydraulic system of any conventional hydraulic automatic pilot.

I claim:

1. In combination in an automatic pilot for aircraft, air spun directional and horizon gyros and air pick-off operated air relays and hydraulic rudder and aileron operating servo motor systems including a follow-up system for each and motor actuating balanced oil valves, an adjustable spring-loaded fluid spun gyro and balanced oil valve operated thereby, a control knob and associated members for adjusting the spring biasing of said fluid spun gyro for predetermining and regulating the flow of pressure oil to said rudder servo motor and consequently the amount and rate of rudder operation, hydraulic means including spring balanced pressure controlling pistons interposed in hydraulic pressure responsive lines interconnecting said rudder and aileron servo motors for automatically effecting a substantially simultaneous rudder and aileron application, the latter varying with the rudder load and correct angle of bank, a control knob and associated shut-off valve for confining pressure fluid flow to said fluid spun gyro assembly for effecting said turn and for distributing flow of pressure fluid to said hydraulic system for normal straightaway flight and a control knob and associated differential gearing for operating said air spun gyro, air pick-off and rudder follow-up system.

2. In combination in an automatic pilot for aircraft, air spun directional and horizon gyros and air pick-off operated air relays and hydraulic rudder and aileron operating servo motor systems including a follow-up system for each and motor actuating balanced oil valves, an adjustable spring-loaded oil spun gyro and balanced oil valve operated thereby incorporated in the hydraulic system of said automatic pilot, control means for adjusting the spring biasing of said oil spun gyro for predetermining and regulating the flow of pressure oil to said rudder servo motor and consequently the amount and rate of rudder operation, hydraulic means including spring balanced pressure controlling pistons interposed in hydraulic pressure responsive lines interconnecting said rudder and aileron servo motors for automatically effecting a substantially simultaneous rudder and aileron application, the latter varying with the rudder load and correct angle of bank, a control valve for confining pressure oil flow to said oil spun gyro assembly for effecting said turn and for distributing flow of pressure oil to the entire hydraulic system for normal straightaway flight and control means for operating said air spun gyro, air pick-off and rudder follow-up system.

3. In combination in an automatic pilot for aircraft, air spun directional and horizon gyros and air pick-off operated air relays and hydraulic rudder and aileron operating servo motor systems including a follow-up system for each and motor actuating balanced oil valves, an adjustable spring-loaded oil spun gyro and balanced oil valve operated thereby incorporated in the hydraulic system of said automatic pilot, means for adjusting the spring biasing of said oil spun gyro for predetermining and regulating the flow of pressure oil to said rudder servo motor and consequently the amount and rate of rudder operation, hydraulic means including spring balanced pressure controlling pistons interposed in hydraulic pressure responsive lines interconnecting said rudder and aileron servo motors for automatically effecting a substantially simultaneous rudder and aileron application, the latter varying with the rudder load and correct angle of bank, means for confining pressure oil flow to said oil spun gyro assembly for effecting said turn and for distributing flow of pressure oil to the entire hydraulic system for normal straightaway flight and means for operating said air spun gyro, air pick-off and rudder follow-up system.

4. In combination in an automatic pilot for aircraft, means for automatically controlling the degree of rudder and aileron control so that it will vary directly with the rate at which said aircraft yaws off of course, said means including air spun directional and horizon gyros and air pick-off operated air relay and hydraulic rudder and aileron operating servo motor systems including a follow-up system for each and motor actuating balanced oil valves, an adjustable spring-loaded oil spun gyro and balanced oil valve operated thereby incorporated in the hydraulic system of said automatic pilot, a control knob and associated members for adjusting the spring biasing of said oil spun gyro for predetermining and regulating the flow of pressure oil to said rudder servo motor and consequently the amount and rate of rudder operation, hydraulic means including spring balanced pressure controlling pistons interposed in hydraulic pressure responsive lines interconnecting said rudder and aileron servo motors for automatically effecting a substantially simultaneous rudder and aileron application, the latter varying with the rudder load and correct angle of bank, a control knob and associated shut-off valve for confining pressure oil flow to said oil spun gyro assembly for effecting said turn and for distributing flow of pressure oil to the entire hydraulic system for normal straightaway flight and a control knob and associated differential gearing for operating said air spun gyro, air pick-off and rudder follow-up system.

5. In combination in an automatic pilot for aircraft, means for automatically controlling the amount and rate of rudder control and turn of said aircraft, said means including air spun directional and horizon gyros and air pick-off operated air relays and hydraulic rudder and aileron operating servo motor systems including a follow-up system for each and motor actuating balanced oil valves, an adjustable spring-loaded oil spun gyro and balanced oil valve operated thereby incorporated in the hydraulic system of said automatic pilot, a control knob and associated members for adjusting the spring biasing of said oil spun gyro for predetermining and regulating the flow of pressure oil to said rudder servo motor and consequently the amount and rate of rudder operation, hydraulic means including spring balanced pressure controlling pistons interposed in hydraulic pressure responsive lines interconnecting said rudder and aileron servo motors for automatically effecting a substantially simultaneous rudder and aileron application, the latter varying with the rudder load and correct angle of bank, a control knob and associated shut-off valve for confining pressure oil flow to said oil spun gyro assembly for effecting said turn and for distributing flow of pressure oil to the entire hydraulic system for normal straightaway flight and a control knob and associated differential gearing for operating said air spun gyro, air pick-off and rudder follow-up system.

6. In combination in an automatic pilot for aircraft, means for automatically controlling the amount and rate of rudder control and turn of said aircraft, said means including air spun directional and horizon gyros and air pick-off operated air relays and hydraulic rudder and aileron operating servo motor systems including a follow-up system for each and motor actuating balanced oil valves, an adjustable spring-loaded oil spun gyro and balanced oil valve operated thereby incorporated in the hydraulic system of said automatic pilot, means for adjusting the spring biasing of said oil spun gyro for predetermining and regulating the flow of pressure oil to said rudder servo motor and consequently the amount and rate of rudder operation, hydraulic means including spring balanced pressure controlling pistons interposed in hydraulic pressure responsive lines interconnecting said rubber and aileron servo motors for automatically effecting a substantially simultaneous rudder and aileron application, the latter varying with the rudder load and correct angle of bank, a shut-off valve for confining pressure oil flow to said oil spun gyro assembly for effecting said turn and for distributing flow of pressure oil to the entire hydraulic system for normal straightaway flight and means for operating said air spun gyro, air pick-off and rudder follow-up system.

7. In combination in an automatic pilot for aircraft, air spun directional and horizon gyros and air pick-off operated air relays and hydraulic rudder and aileron operating servo motor systems including a follow-up system for each and motor actuating balanced oil valves, an adjustable spring-loaded oil spun gyro and balanced oil valve operated thereby incorporated in the hydraulic system of said automatic pilot, a control knob and associated members for adjusting the spring biasing of said oil spun gyro for predetermining and regulating the flow of pressure oil to said rudder servo motor and consequently the amount and rate of rudder operation, hydraulic means including spring balanced pressure controlling pistons interposed in hydraulic pressure responsive lines interconnecting said rudder and aileron servo motors for automatically effecting a substantially simultaneous rudder and aileron application, the latter varying with the rudder load and correct angle of bank, a control knob and associated shut-off valve for confining pressure oil flow to said oil spun gyro assembly for effecting said turn and for distributing flow of pressure oil to the entire hydraulic system for normal straightaway flight and a control knob and associated differential gearing for operating said air spun gyro, air pick-off and rudder follow-up system.

8. In combination in an automatic pilot for aircraft, air spun directional and horizon gyros and air pick-off operated air relays and hydraulic rudder and aileron operating servo motor systems including a follow-up system for each and motor actuating balanced oil valves, means for automatically predetermining the rate and amount of rudder control and aircraft turn, said means including an adjustable spring-loaded oil spun gyro and balanced oil valve operated thereby incorporated in the hydraulic system of said automatic pilot, a control means for adjusting the spring biasing of said oil spun gyro for predetermining and regulating the flow of pressure oil to said rudder servo motor and consequently the amount and rate of rudder operation, hydraulic means including spring balanced pressure controlling pistons interposed in hydraulic pressure responsive lines interconnecting said rudder and aileron servo motors for automatically effecting a substantially simultaneous rudder and aileron application, the latter varying with the rudder load and correct angle of bank, control means including a shut off valve for confining pressure oil flow to said oil spun gyro assembly for effecting said turn and for distributing flow of pressure oil to the entire hydraulic system for normal straightaway flight and a control means for operating said air spun gyro, air pick-off and rudder follow-up system.

BERT G. CARLSON.